April 18, 1944. A. M. STONER 2,346,707
COLLET
Original Filed May 4, 1943
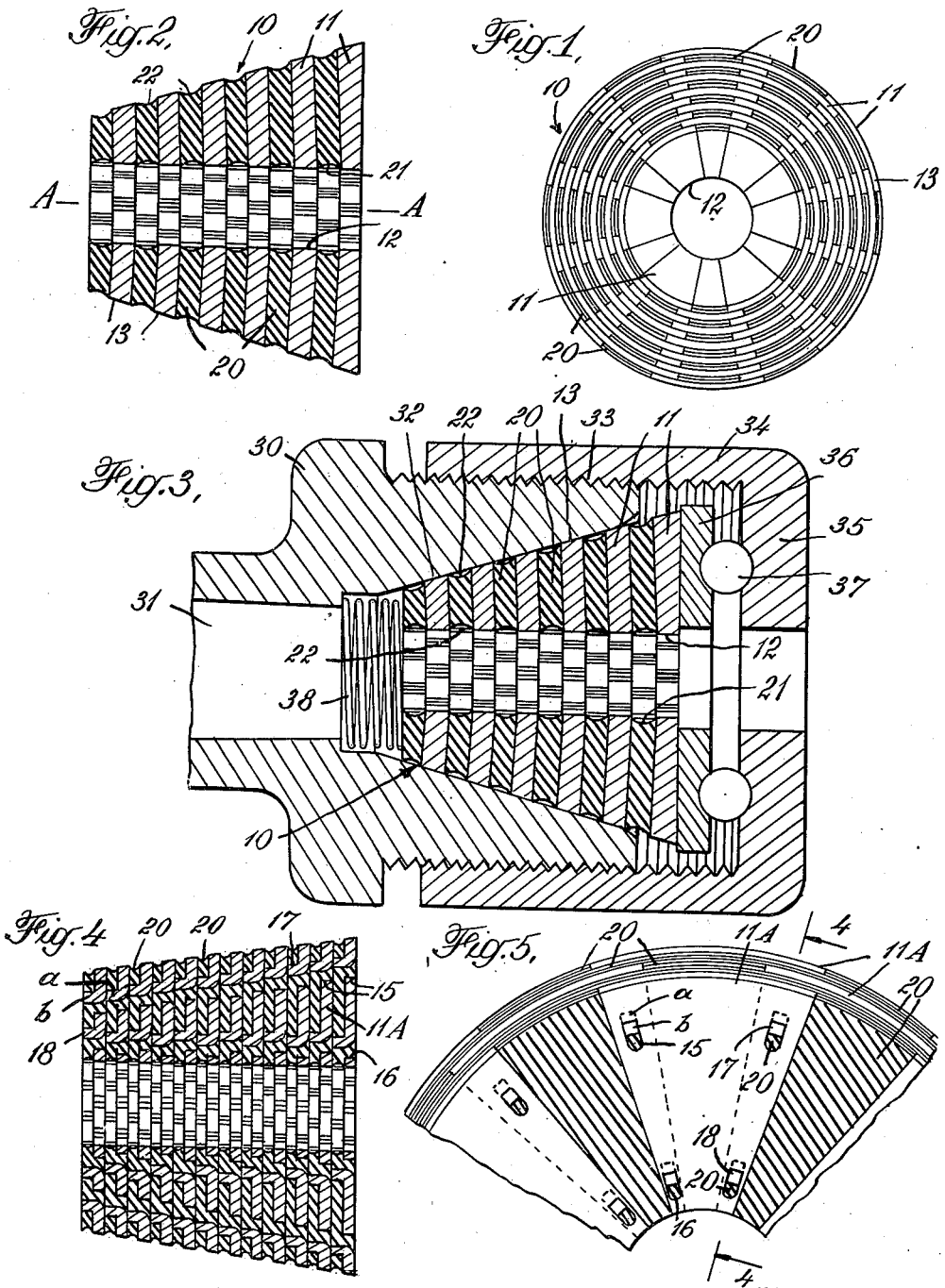
INVENTOR
ARTHUR MERRICK STONER
BY
E. W. Marshall
ATTORNEY Patented Apr. 18, 1944

2,346,707

UNITED STATES PATENT OFFICE 2,346,707

COLLET

Arthur Merrick Stoner, West Hartford, Conn., assignor to The Jacobs Manufacturing Company, Hartford, Conn., a corporation of Connecticut Original application May 4, 1943, Serial No. 485,583. Divided and this application August 14, 1943, Serial No. 498,615

8 Claims. (Cl. 279—46)

This invention relates to a collet of novel construction which is of simple, inexpensive construction and has many advantages over such devices as have been available heretofore. This application is a division of application Serial No. 485,583 filed May 4, 1943, and allowed July 27, 1943.

In the drawing which forms a part of this specification, Fig. 1 is a rear elevation and Fig. 2 a sectional side elevation of a collet which is made according to and embodies this invention.

Fig. 3 is a central sectional side elevation of a chuck of which a collet of my novel construction is a part. This figure is included to show a way in which the collet disclosed herein may be used.

Fig. 4 is a sectional side elevation of a collet of modified construction which also embodies the present invention. The section in this figure is taken on the line 4—4 of Fig. 5.

Fig. 5 is a rear elevation on a larger scale of a part of the collet shown in Fig. 4.

In Figs. 1, 2 and 3, 10 designates a collet which comprises a plurality of longitudinally spaced series of sector-like gripping members 11 disposed circumferentially about a common axis. These members may be made conveniently from flat metallic plates. The inner and outer edges of the plates are exposed. Their inner edges lie in a common cylindrical surface and their outer edges form parts of a frusto-conical surface. The plates may be in planes normal to the axis about which they are disposed, or inclined to such planes as shown in Fig. 2. The plates of each series are angularly staggered from those of adjacent series as shown in Fig. 1. All of the plates are interconnected by a binder 20 of adherent resilient material which fills the spaces between the edges of adjacent plates of each series and the spaces between adjacent series of plates. Rubber or rubber composition is an example of a satisfactory material for the purpose of this invention and this may be vulcanized to adhere firmly to the gripping members. This effectively holds the gripping members in desired longitudinally and angularly spaced relations but because of its resiliency permits them to be moved out of these positions.

While the gripping members are held in the positions shown in Figs. 1 and 2, their inner edges 12 may be tooled or ground to lie in the surface of a cylinder concentric with the axis A—A and their outer edges 13 finished to form parts of a frusto-conical surface also concentric with the same axis. The inner and outer edges of the gripping members are exposed, that is, they are not covered by the resilient binder and the latter is preferably depressed below these edges as shown at 21 and 22.

Before describing the collet shown in Figs. 4 and 5 I will refer to Fig. 3 and show one of the ways in which this invention may be used. In this Fig. 3, 30 designates the body of a chuck. In the rear end of this body is a tapered bore 31 by means of which it may be mounted on a machine tool. 32 is a conical cam surface in the front end of the body having an angularity which corresponds to that of the outer edges 13 of the gripping members. The outer front end of the body is of reduced diameter and is externally threaded as at 33. 34 is a collar having internal threads which fit the threads 33. The collar has an inwardly projecting flange 35 which partly overlies the conical cam surface 32 in the body.

After a collet 10, such as that shown in Figs. 1 and 2 has been placed within the conical cam surface 32, a thrust plate 36 is placed on the larger end of the collet and the collar 34 screwed onto the body 30. If desired, anti-friction thrust bearings 37 may be interposed between the flange 35 and the thrust plate 36. 38 is a spring interposed between the inner end of the collect and the chuck body 30.

Now when a tool or other desired article is placed within the collet, the collar 34 may be rotated further to impart a longitudinal movement to the thrust plate and to the collet. Unlike other collets the inner edges of the gripping members will be forced inwardly by the conical cam surface without being moved out of parallelism with the axis of the chuck.

If the gripping members are inclined in the manner shown in Figs. 1 and 3 their grip upon the inserted article will be increased by any inward pressure exerted upon the article.

Unscrewing the collar will release the longitudinal pressure on the collet and upon the article within it and allow the spring 38 to move the collet outwardly. The article within the gripping members may then be removed.

In Figs. 4 and 5 radially spaced orifices 15 and 16 are formed in the gripping plates 11A by punching out lugs 17 and 18 of equal length which protrude at right angles to the sides of the gripping plates. The resilient binder 20 passes through these orifices. When assembled, the lugs of each series of plates abut against the proximate surfaces of the plates of an adjacent series of plates and prevent relative longitudinal movement of the plates. In order to prevent the lugs coming opposite the orifices they may be relatively staggered as shown at *a* and *b* in the drawing.

Other modifications than those shown and described may be made within the spirit and scope of this invention and I intend no limitations other than those imposed by the following claims.

What is claimed is:

1. A circumferentially continuous machine tool collet to be actuated by a conical cam surface of a chuck comprising a plurality of longitudinally spaced axially aligned series of circumferentially spaced sector-like rigid gripping members, and a body of resilient material interconnecting the members, bonded thereto and arranged to maintain said members in fixed angular relation to the axis around which they are disposed, with the inner and outer edges of the members exposed and with portions of the members extending to a conical surface to engage said cam surface.

2. A circumferentially continuous machine tool collet to be actuated by a conical cam surface of a chuck comprising a plurality of longitudinally spaced axially alined series of circumferentially spaced sector-like rigid gripping members, and a body of resilient material interconnecting the members, bonded thereto and arranged to maintain said members in fixed angular relation to the axis around which they are disposed, with the inner and outer edges of the members exposed and with portions of the members extending to a conical surface to engage said cam surface, the sector like members of adjacent series being angularly staggered with respect to each other.

3. A circumferentially continuous machine tool collet to be actuated by a conical cam surface of a chuck comprising a plurality of longitudinally spaced axially alined series of circumferentially spaced sector-like rigid gripping members inclined to the axis around which they are disposed, and a body of resilient material interconnecting the members, bonded thereto and arranged to maintain said members in fixed angular relation, with the inner and outer edges of the members exposed and with portions of the members extending to a conical surface to engage said cam surface.

4. A circumferentially continuous machine tool collet to be actuated by a conical cam surface of a chuck comprising a plurality of longitudinally spaced axially alined series of circumferentially spaced metallic plates and a body of resilient material interconnecting the members, bonded thereto and arranged to maintain said members in fixed angular relation to the axis around which they are disposed, with the inner and outer edges of the members exposed and with portions of the members extending to a conical surface to engage said cam surface.

5. A circumferentially continuous machine tool collet to be actuated by a conical cam surface of a chuck comprising a plurality of longitudinally spaced axially alined series of circumferentially spaced flat metallic perforated plates, and a body of resilient material between said plates, passing through the perforations therein and arranged to maintain said members in fixed angular relation to the axis around which they are disposed, with the inner and outer edges of the members exposed and with portions of the members extending to a conical surface to engage said cam surface.

6. A circumferentially continuous machine tool collet to be actuated by a conical cam surface of a chuck comprising a plurality of longitudinally spaced axially alined series of circumferentially spaced flat metallic plates having orifices formed therein, and adjacent protruding lugs and a body of resilient material between said plates, passing through the orifices therein and arranged to maintain said members in fixed angular relation to the axis around which they are disposed, with the inner and outer edges of the members exposed and with portions of the members extending to a conical surface to engage said cam surface.

7. A circumferentially continuous machine tool collet to be actuated by a conical cam surface of a chuck comprising a plurality of longitudinally spaced axially alined series of circumferentially spaced flat metallic plates having orifices formed therein, and adjacent protruding lugs and a body of resilient material between said plates, passing through the orifices therein and arranged to maintain said members in fixed angular relation to the axis around which they are disposed, with the inner and outer edges of the members exposed and with portions of the members extending to a conical surface, to engage said cam surface, with no portion of the resilient material extending beyond the cam engaging portions of the plates, the lugs of each plate abutting the side of a plate of an adjacent series of plates.

8. A circumferentially continuous machine tool collet to be actuated by a conical cam surface of a chuck comprising a plurality of longitudinally spaced axially alined series of circumferentially spaced flat metallic plates having orifices formed therein, and adjacent protruding lugs and a body of resilient material between said plates, passing through the orifices therein and arranged to maintain said members in fixed angular relation to the axis around which they are disposed, with the inner and outer edges of the members exposed and with the outer portions of the members extending to a conical surface, to engage said cam surface, with no portion of the resilient material extending outwardly beyond the cam engaging portions of the plates, the lugs of each plate abutting the side of a plate of an adjacent series of plates.

ARTHUR MERRICK STONER.